United States Patent [19]
Huffman et al.

[11] Patent Number: 5,865,895
[45] Date of Patent: Feb. 2, 1999

[54] SYRUP SPRAY SYSTEMS ESPECIALLY USEFUL FOR THE PRODUCTION OF FROZEN DESSERT CONES

[75] Inventors: Edward L. Huffman, Finksburg; William J. Searle, Glen Burnie, both of Md.; Kenneth H. Bealer, Wllmington, N.C.

[73] Assignee: Sweetheart Cup Company Inc., Owings Mills, Md.

[21] Appl. No.: 929,368

[22] Filed: Sep. 17, 1997

[51] Int. Cl.⁶ ........................................... B05C 5/00
[52] U.S. Cl. ........................... 118/681; 118/16; 118/24; 118/315; 118/317; 118/323; 118/324
[58] Field of Search .................... 118/681, 16, 24, 118/315, 317, 323, 324; 426/139, 282, 284, 302, 306; 99/450.1, 450.6; 239/600, 551, 562

[56] References Cited

U.S. PATENT DOCUMENTS

| | | | |
|---|---|---|---|
| 2,841,074 | 7/1958 | Schechter | 118/323 |
| 2,915,024 | 12/1959 | Krager et al. | 118/24 |
| 3,777,504 | 12/1973 | Marchi . | |
| 4,188,768 | 2/1980 | Getman . | |
| 4,192,415 | 3/1980 | Krener et al. . | |
| 4,224,895 | 9/1980 | Launay . | |
| 4,283,012 | 8/1981 | Hanson | 118/24 |
| 4,498,273 | 2/1985 | Colamussi . | |
| 4,505,220 | 3/1985 | Bank et al. | 118/16 |
| 4,555,892 | 12/1985 | Dijkman . | |
| 4,643,905 | 2/1987 | Getman . | |
| 4,686,813 | 8/1987 | Sawada . | |
| 4,694,637 | 9/1987 | Bech et al. . | |
| 4,731,977 | 3/1988 | Maekawa . | |
| 4,793,279 | 12/1988 | Grenier | 118/16 |
| 4,799,351 | 1/1989 | Blanda . | |
| 4,899,866 | 2/1990 | Colamussi . | |
| 4,901,502 | 2/1990 | Colamussi . | |
| 5,064,666 | 11/1991 | Vos . | |
| 5,102,672 | 4/1992 | Vos . | |
| 5,228,267 | 7/1993 | Blankenship et al. . | |
| 5,257,493 | 11/1993 | Cocchi et al. . | |
| 5,298,273 | 3/1994 | Ito . | |
| 5,379,569 | 1/1995 | Mueller . | |

FOREIGN PATENT DOCUMENTS 2277891 11/1994 United Kingdom ................... 239/562

Primary Examiner—Laura Edwards
Attorney, Agent, or Firm—Nixon & Vanderhye P.C.

[57] ABSTRACT

Syrup spray systems for producing frozen dessert cones include a manifold block defining a bore therethrough. At least one nozzle assembly is provided in fluid communication with the bore of the manifold block and having an actuator stem reciprocally movable between an inoperative condition (in which liquid syrup in the bore is prevented from being sprayed into an awaiting cone), and an operative condition (in which liquid syrup in the bore is sprayed into an awaiting cone). A control cylinder moves the actuator stem between the operative and inoperative conditions and is coupled removably to the actuator stem. In such a manner, the manifold block and the at least one nozzle assembly thereof may easily be removed from the control cylinder to permit repair and/or replacement thereof.

12 Claims, 4 Drawing Sheets

SYRUP SPRAY SYSTEMS ESPECIALLY USEFUL FOR THE PRODUCTION OF FROZEN DESSERT CONES

FIELD OF THE INVENTION

The present invention relates generally to the field of automated packaging systems. More specifically, the present invention relates to automated packaging systems whereby syrup may be sprayed or otherwise applied onto frozen confections during the production of frozen dessert cones.

BACKGROUND AND SUMMARY OF THE INVENTION

Individually wrapped frozen confection or desert cones are well known. Specifically, frozen dessert cones have an edible cone-shaped container (e.g., a sugar cone or the like) which is filled with a freezable dairy product, such as ice cream, ice milk, frozen yogurt or the like. The filled cone is covered with a conformably shaped paper or foil wrapper which is usually closed at its upper end by a lid. When the frozen confection is desired to be consumed, the lid and wrapper are removed thereby allowing the cone and its frozen dairy product to be eaten.

The automated production of frozen dessert cones is well known, for example, through U.S. Pat. No. 4,188,768 to Getman (the entire content of which is expressly incorporated hereinto by reference). In general, frozen dessert cones are produced by intermittently advancing a nested cone assembly (comprised of the frustroconically shaped edible prebaked cone and its conformably shaped paper overwrap) through a succession of stations. Thus, for example, an atomized spray of chocolate (or other flavored syrup) may be sprayed on the interior surfaces of the edible cone prior to the cone being filled with a freezable dairy product. Thereafter, a topping of chocolate (or other flavored syrup) and nuts may be applied immediately upstream of a lid applicator. The finished product is then ejected from its conveyance track and subjected to freezing conditions.

The spray nozzles employed to spray liquid syrup under pressure into the cones may need to be repaired and/or replaced periodically. However, conventional syrup spray systems do not readily allow the nozzle assemblies thereof to be readily removed thereby resulting in undesirably long production stoppages. Therefore, it would be especially desirable if a syrup spray system were provided which allowed for the spray nozzle assemblies to be relatively quickly removed. It is toward providing such a system that he present invention is directed.

In preferred embodiments, the syrup spray systems of this invention include a manifold block defining a bore therethrough. At least one nozzle assembly is provided in fluid communication with the bore of the manifold block and having an actuator stem reciprocally movable between an inoperative condition (in which liquid syrup in the bore is prevented from being sprayed into an awaiting cone), and an operative condition (in which liquid syrup in the bore is sprayed into an awaiting cone). A control cylinder moves the actuator stem between the operative and inoperative conditions and is coupled removably to the actuator stem. In such a manner, the manifold block and the at least one nozzle assembly thereof may easily be removed from the control cylinder to permit repair and/or replacement thereof.

These, and other aspects and advantages of the present invention will become more clear from the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structure elements, and wherein.

DETAILED DESCRIPTION OF THE INVENTION

Figure 1:
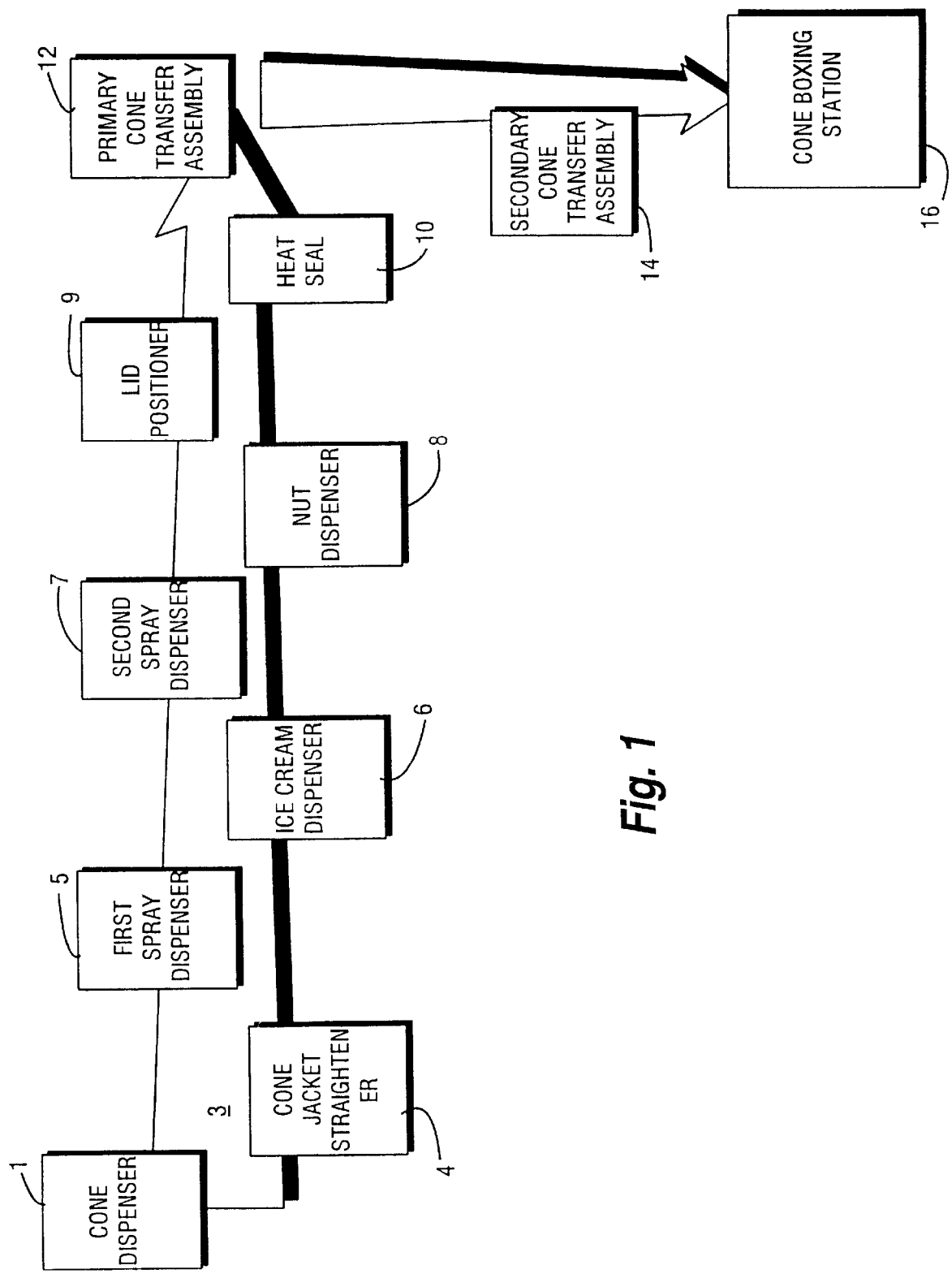
FIG. 1 is a schematic box diagram showing the various stations employed to automatically fill package frozen dessert cones which includes a lid transfer and positioning system in accordance with the present invention.

Accompanying FIG. 1 depicts schematically the various operations employed in the present invention. Specifically, frozen confection cones may be produced using any number (or all) of the production stations disclosed more fully in the above-cited U.S. Pat. No. 4,188,768 to Getman. That is, the system 1 may include a cone dispensing station 2 whereby nested edible cones and their conformably shaped paper overwraps may be dispensed onto a conveyor 3. Most preferably, the cone dispensing station includes a system as described more fully in copending and commonly owned U.S. patent application Ser. No. 08/93,939 (Atty. Dkt. No. 956-176) filed even date herewith (the entire content of which is expressly incorporated hereinto by reference). The cones may thereafter be brought into the cone jacket straightener 4 which ensures that the cones and jackets are properly positioned on the conveyor 3.

The cones may then be brought sequentially through a first spray dispenser 5, an ice cream dispenser 6 and a second spray dispenser 7. The first spray dispenser 5 dispenses a spray of flavored syrup (e.g., chocolate) so as to coat the interior surface of the cone into which the ice cream is to be dispensed by the dispenser 6. The second spray dispenser 7 will thereafter dispense a flavored syrup topping spray onto the ice cream in the cone. A quantity of nuts may thereafter be applied to the top of the ice cream in the cone by the nut dispenser 8. A paper lid is positioned over the top of the ice cream filled cone by the lid positioner and is heat-sealed to the outer paper wrapper by means of the heat seal unit 10. One particularly preferred container lidding system that may be employed in the lid positioner station 9 is disclosed more fully in U.S. application Ser. No. 08/931,939 filed even date herewith (Atty. Dkt. No. 956-177), the entire content of which is expressly incorporated hereinto by reference.

Thereafter, the finished cones are transferred by the primary cone transfer station 12 so that multiple pairs of such cones are reoriented from their machine aligned position to a head-to-tail cross-machine position as briefly noted above. The reoriented array of cones may then be brought to the secondary cone transfer assembly 14 where the array is transferred as a unit to a cone boxing station 16. The cone array is thus placed by the secondary transfer station 14 into a suitably configured container at the boxing station 16 conforming to the external shape of the cone array. The boxed cones may then be shipped to retail customers. Most preferably, the primary and secondary cone transfer assemblies are in accordance with U.S. application Ser. No. No. 08/889,878 filed Jul. 8, 1997 (Atty. Dkt. No. 956-173), the entire content of which is expressly incorporated hereinto by reference.

Figure 2:
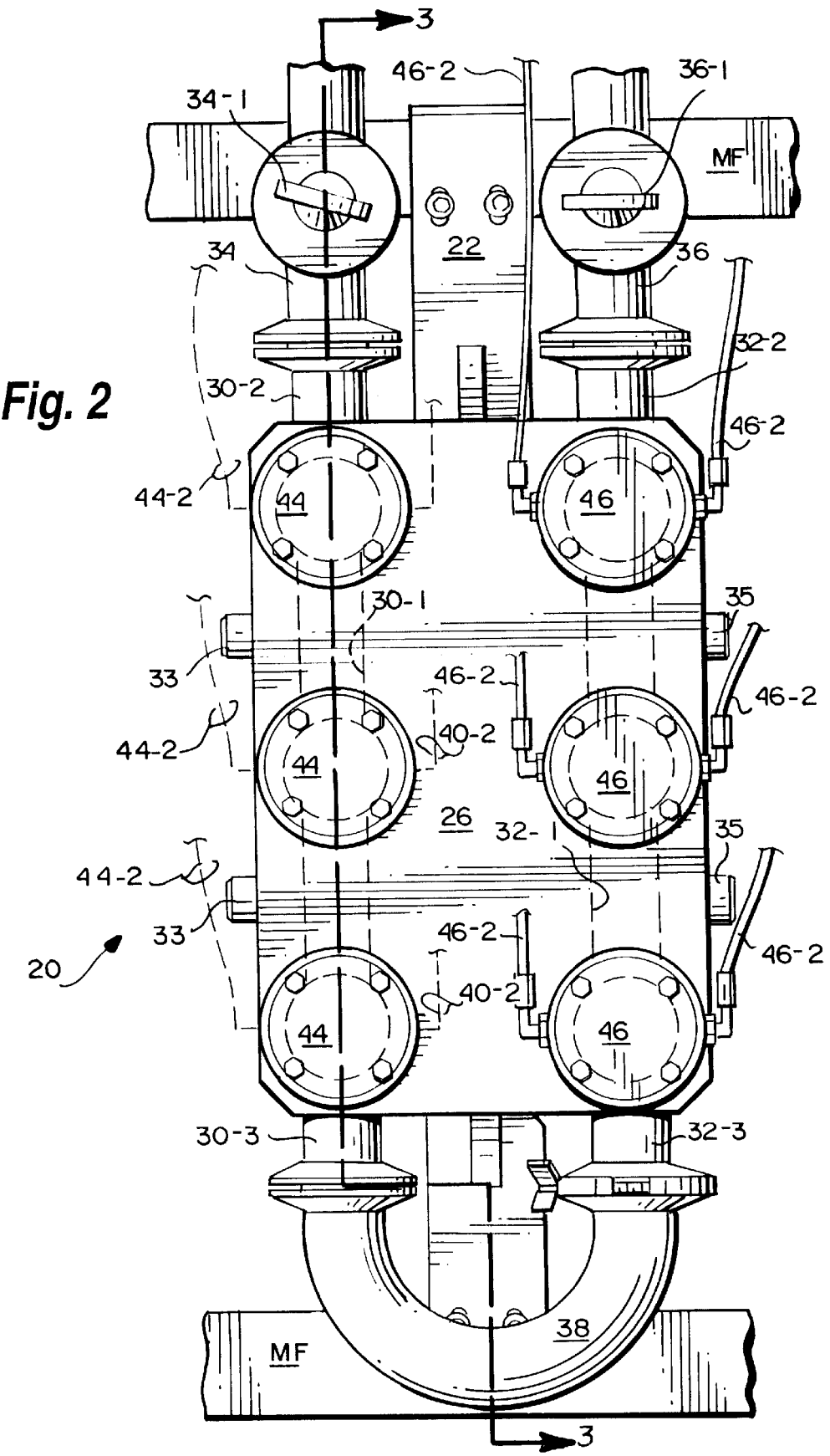
FIG. 2 is a top plan view of a syrup spray system in accordance with the present invention.
Figure 3:
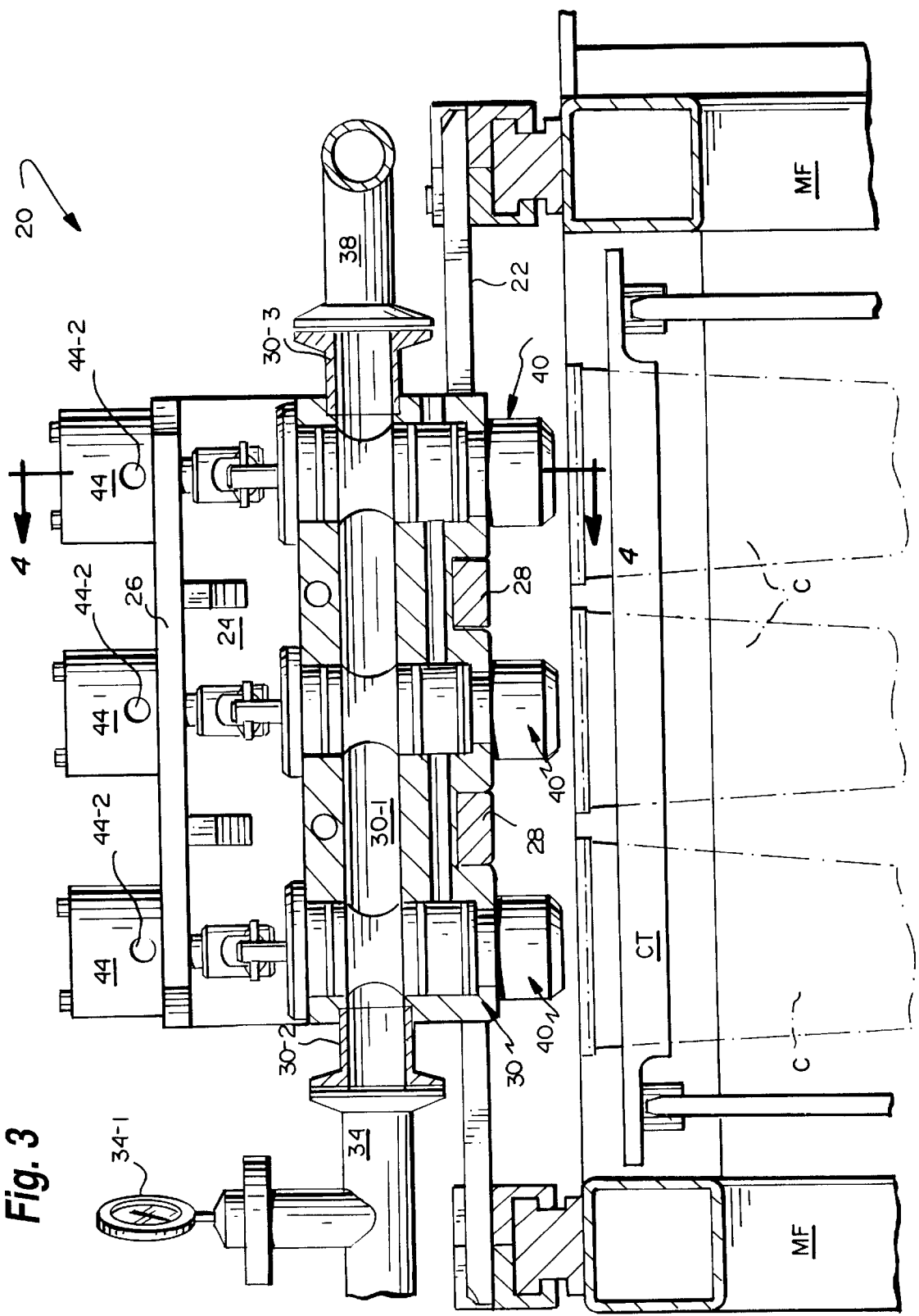
FIG. 3 is a side elevational of the syrup spray system depicted in FIG. 2 as taken along lines 3—3 therein.
Figure 4:
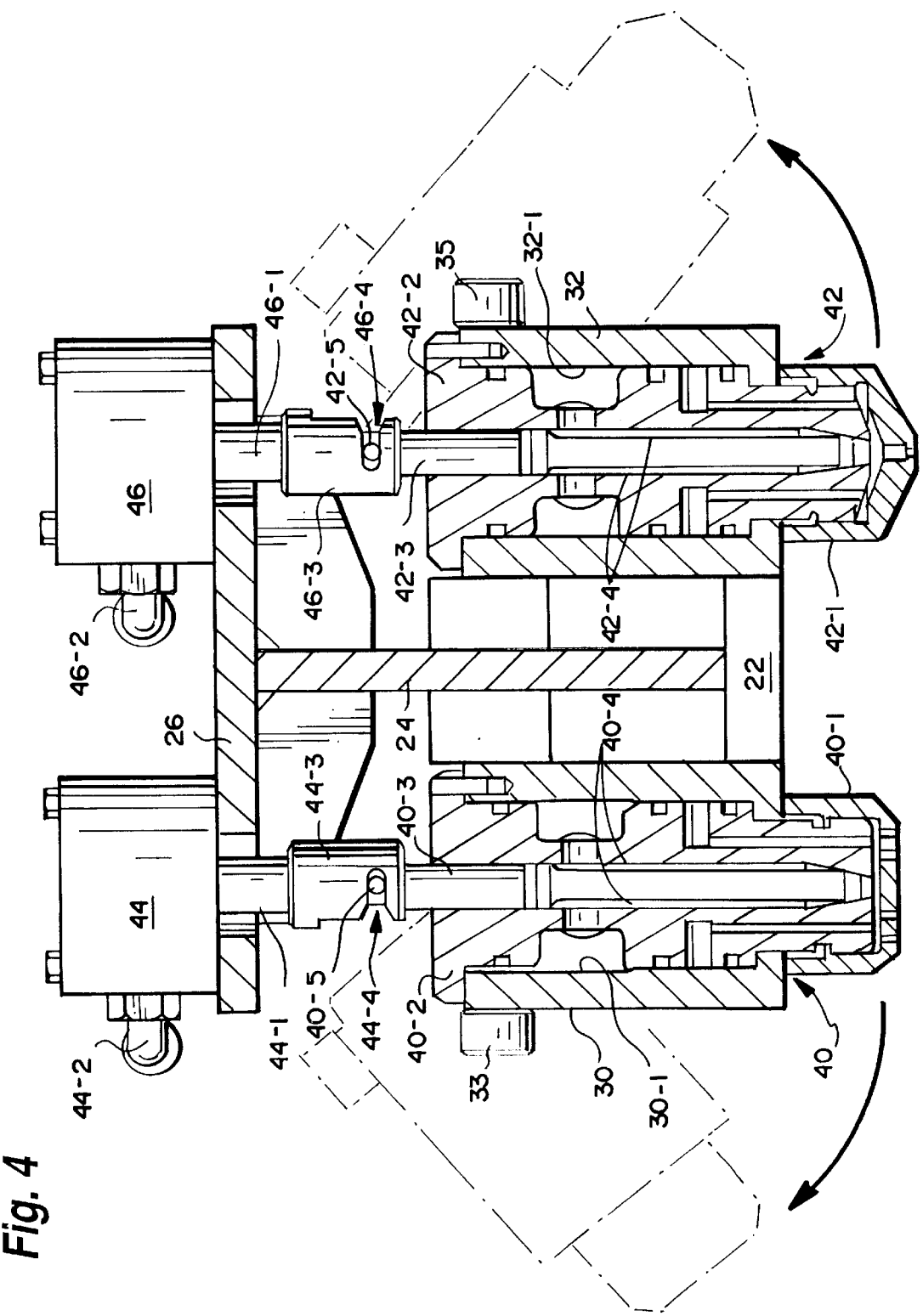
FIG. 4 is an enlarged cross-sectional elevational view of the syrup spray system depicted in FIG. 3 as taken along lines 4—4 therein.

Accompanying FIGS. 2–4 show in greater detail the structural components of a particularly preferred syrup spray system 20 according to the present invention that may usefully be employed in the spray stations 5 and/or 7 depicted in FIG. 1.

In this regard, the system 20 includes a frame assembly 22 which is attached to the frozen dessert cone machine frame MF so as to bridge in a-cross-machine direction the conveyor trays CT carrying frozen dessert cones C (see FIG. 3). The frame assembly 22 includes an upright frame member 24 which supports an upper support plate 26. The frame assembly 22 also includes at least one pair of support posts 28 cantilevered therefrom and extending in the machine direction. The support posts 28 are provided so as to removably support a pair of manifold blocks 30, 32. In this regard, bolt sets 33, 35 removably fix the manifold blocks 30, 32 to the support assembly 22.

The manifold blocks 30, 32 each define a central bore 30-1, 32-1, respectively, for allowing syrup to flow therethrough. Each end of bores 30-1, 30-2 includes flanged conduits 30-2, 30-3 and 32-2, 32-3, respectively. The flanged conduit 30-2 is connected operatively to a syrup inlet conduit 34, while the conduit 32-2 is connecting to a syrup discharge conduit 36. The conduits 30-3 and 32-3 are connected to one another via a U-shaped conduit 38. In such a manner, therefore, the manifold blocks 30, 32 are fluid-connected in series so that the syrup flows first through the manifold block 30 and then on to the manifold block 32. During normal use, a continuous flow of syrup is supplied under pressure to, and through, the manifold blocks 30, 32 from a heated syrup supply tank (not shown). The inlet and discharge conduits 34, 36 are thus most preferably provided with pressure gages 34-1, 36-1 so that the pressure of the liquid syrup flowing therein may be measured. Preferably, substantially constant liquid syrup pressure (and hence substantially constant liquid syrup flow) is achieved via a simple pinch clamp (not shown) operatively associated with the inlet and/or discharge conduits 34, 36.

The manifold blocks 30, 32 receive a plurality of spray nozzle assemblies 40, 42, respectively. In this regard, each of the nozzle assemblies 40, 42 include a lower nozzle head 40-1, 42-1 adapted to spray liquid syrup supplied to the bores 30, 32, respectively, into an awaiting cone C brought into registry therewith. As shown in FIG. 4, the nozzle head 40 may be configured so as to spray the liquid syrup onto an interior wall of the cone C and thus be well suited for use in station 5 depicted in FIG. 1. On the other hand, nozzle head 42 may be configured to spray a top layer of syrup upon the frozen confection filling the cone C and thus may be usefully employed in the station 7 depicted in FIG. 1.

In either case, the nozzle assemblies 40, 42 are coupled operatively to a source of pressurized atomizing air (not shown). The atomizing air allows control to be exercised over the spray pattern and also clears the nozzle assemblies 40, 42 of syrup for a drip-free shut-off.

The nozzle assemblies 40, 42 include a central nozzle body 40-2, 42-2 which slidably receives an actuator stem 40-3, 42-3 for reciprocal movements between an inoperative condition (in which liquid syrup is prevented from being issued through the nozzle heads 40-1, 42-1) and an operative condition (in which liquid syrup under pressure is issued from the nozzle head 40-1, 42-1). In this regard, each of the actuator stems include longitudinally extending slots 40-4, 42-4 which direct the liquid syrup under pressure to the nozzle heads 40-1, 42-1, respectively. Since the liquid syrup supplied to the nozzle assemblies 40, 42 is substantially constant, a substantially constant opening time for the actuator stems 40-2, 42-2 will control the spray volume of the atomized liquid syrup.

Reciprocal movements of the actuator stems 40-2, 42-2 is respectively controlled by pneumatic control cylinders 44, 46. In this regard, the control cylinders 44, 46 include a control rod 44-1, 46-1 which extends and contracts based on pressurized air being supplied to and/or exhausted from the pneumatic lines 44-2, 46-2. The control rods 44-1, 46-1 are each provided with a coupling member 44-3, 46-3 which removably receives the cross-support pins 40-5, 42-5 fixed at the upper ends of the actuator stems 40-3, 42-3, respectively. Thus, upon operation of the control cylinders 44, 46, the control rods 44-1, 46-1 will retract thereby lifting the actuator stems 40-3, 42-3 and allowing liquid syrup to be sprayed from the nozzle heads 40-1, 42-1. When the spray cycle is over, the control cylinders 44, 46 will be returned to their normal state as depicted in the drawings thereby terminating the spray of liquid syrup from the nozzle heads 40-1, 42-1.

When any one of the nozzle bodies 40-2, 42-2 needs to be changed and/or serviced, the screws 33 and/or 35 may be removed thereby allowing the entire manifold block 30 and/or 32 to be pivoted about the axis of pins 40-5, 42-5. The entire manifold block 30 and/or 32 may then be removed physically by withdrawing the pins 40-5 and/or 42-5 from the slot 44-4, 46-4 of the coupling member 44-3, 46-3.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A syrup spray system for producing frozen dessert cones comprising:

a manifold block defining a bore therethrough;

at least one nozzle assembly in fluid communication with said bore of said manifold block and having an actuator stem reciprocally movable between an inoperative condition, in which liquid syrup in said bore is prevented from being sprayed into an awaiting cone, and an operative condition in which liquid syrup in said bore is sprayed into an awaiting cone;

a control cylinder for moving said actuator stem between said operative and inoperative conditions; and a coupling member for removably coupling said control cylinder to said actuator stem, wherein said coupling member includes a pivot axis which is disposed crosswise to said actuator stem to allow said actuator stem and said manifold assembly to be pivoted laterally relative to said control cylinder which, in turn, allows said manifold block and said at least one nozzle assembly thereof to be removed from said control cylinder.

2. The system of claim 1, wherein said actuator stem includes a cross-pin received within said coupling member.

3. The system of claim 2, wherein said coupling member includes a slot which receives said cross-pin of said actuator stem.

4. The system of claim 1, wherein said control cylinder is a pneumatic control cylinder.

5. A syrup spray system for the production of frozen dessert cones, comprising:

a pair of parallel manifold blocks each having a bore therethrough;

a conduit for fluid-connecting said bores of said manifold blocks in series such that liquid syrup under pressure may continuously flow through an upstream one of said manifold blocks and then flow through a downstream one of said manifold blocks;

each said manifold block including a set of nozzle assemblies corresponding in number to the number of cones in which syrup is to be sprayed, wherein each said nozzle assemblies includes, (i) an actuator stem reciprocally movable between an inoperative condition, in which liquid syrup in said bore is prevented from being sprayed into an awaiting cone, and an operative condition in which liquid syrup in said bore is sprayed into an awaiting cone;

(ii) a control cylinder for moving said actuator stem between said operative and inoperative conditions; and (iii) a coupling member for removably and pivotally coupling said control cylinder to said actuator stem, wherein said coupling member includes a pivot axis which is disposed crosswise to said actuator stem to allow said actuator stem and said manifold assembly to be pivoted laterally relative to said control cylinder which, in turn, allows said manifold block and said at least one nozzle assembly thereof to be removed from said control cylinder.

6. The system of claim 5, wherein said actuator stem includes a cross-pin received within said coupling member.

7. The system of claim 6, wherein said coupling member includes a slot which receives said cross-pin of said actuator stem.

8. The system of claim 5, wherein said control cylinder is a pneumatic control cylinder.

9. A syrup spray system for producing frozen dessert cones comprising:

a conveyor assembly for conveying frozen dessert cones in a machine direction;

a frame assembly bridging said conveyor assembly in a cross-machine direction;

a plurality of control cylinders fixed to and supported by said frame assembly, said control cylinders having control rods dependently extending therefrom;

a plurality of spray nozzle assemblies associated operatively with respective ones of said control cylinders;

said spray nozzle assemblies including actuator stems; and a coupling member which defines a pivot axis for pivotally coupling respective ones of said control rods and actuator stems to allow said spray nozzle assemblies to be pivoted in said machine direction relative to said frame assembly.

10. The system of claim 9, wherein said coupling member includes a pin which defines said pivot axis.

11. The system of claim 10, wherein said coupling member includes a slot which removably receives said pin.

12. The system of claim 9, wherein said control cylinder is a pneumatic control cylinder.

* * * * *